United States Patent
Eastwood et al.

(10) Patent No.: US 10,669,939 B2
(45) Date of Patent: Jun. 2, 2020

(54) COMBUSTOR SEAL FOR A GAS TURBINE ENGINE COMBUSTOR

(71) Applicant: United Technologies Corporation, Farmington, CT (US)

(72) Inventors: Jonathan Jeffery Eastwood, West Hartford, CT (US); Dennis M. Moura, South Windsor, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 716 days.

(21) Appl. No.: 15/334,804

(22) Filed: Oct. 26, 2016

(65) Prior Publication Data
US 2018/0112597 A1 Apr. 26, 2018

(51) Int. Cl.
| | |
|---|---|
| F02C 7/18 | (2006.01) |
| F01D 11/00 | (2006.01) |
| F01D 25/12 | (2006.01) |
| F23R 3/00 | (2006.01) |
| F01D 9/02 | (2006.01) |
| F01D 9/04 | (2006.01) |
| F02C 7/28 | (2006.01) |

(52) U.S. Cl.
CPC ............... *F02C 7/18* (2013.01); *F01D 9/023* (2013.01); *F01D 9/041* (2013.01); *F01D 11/00* (2013.01); *F01D 11/005* (2013.01); *F01D 25/12* (2013.01); *F02C 7/28* (2013.01); *F23R 3/00* (2013.01); *F23R 3/002* (2013.01); *F05D 2220/32* (2013.01); *F05D 2240/35* (2013.01); *F05D 2240/55* (2013.01); *Y02T 50/675* (2013.01)

(58) Field of Classification Search
CPC .... F02C 7/18; F02C 7/28; F01D 11/00; F01D 11/005; F01D 25/12; F01D 9/023; F01D 9/041; F23R 3/00; F23R 3/002; F05D 2240/35; F05D 2240/55
See application file for complete search history.

(56) References Cited

U.S. PATENT DOCUMENTS

| | | | |
|---|---|---|---|
| 5,758,503 A | 6/1998 | DuBell et al. | |
| 5,775,108 A | 7/1998 | Ansart et al. | |
| 5,775,589 A | 7/1998 | Vdoviak et al. | |
| 6,282,905 B1 | 9/2001 | Sato et al. | |
| 7,797,948 B2* | 9/2010 | Weaver | F01D 9/023 |
| | | | 277/399 |
| 8,113,004 B2 | 2/2012 | Carlisle et al. | |
| 8,256,224 B2 | 9/2012 | Garry et al. | |

(Continued)

FOREIGN PATENT DOCUMENTS

| | | |
|---|---|---|
| DE | 102015119554 A1 | 5/2016 |
| EP | 2278125 A2 | 1/2011 |
| WO | 2016036382 A1 | 3/2016 |

OTHER PUBLICATIONS

European Search Report dated Mar. 8, 2018 issued for corresponding European Patent Application No. 17197198.9.

*Primary Examiner* — Craig Kim

(74) *Attorney, Agent, or Firm* — Bachman & LaPointe, P.C.

(57) ABSTRACT

A combustor seal for use in a combustor of a gas turbine engine including a seal with a multiple of slots that correspond with a multiple of 1st HPT vanes. A method of cooling within a gas turbine engine including communicating cooling air through combustor seal toward each of a multiple of 1st HPT vanes.

19 Claims, 10 Drawing Sheets

(56) References Cited

U.S. PATENT DOCUMENTS

| | | |
|---|---|---|
| 8,266,914 B2 | 9/2012 | Hawie et al. |
| 8,359,865 B2 | 1/2013 | Dierberger et al. |
| 8,359,866 B2 | 1/2013 | Dierberger et al. |
| 8,388,307 B2 | 3/2013 | Smoke et al. |
| 8,393,155 B2 | 3/2013 | Piper et al. |
| 8,408,010 B2 | 4/2013 | Garry et al. |
| 2002/0116929 A1 | 8/2002 | Snyder |
| 2002/0184892 A1 | 12/2002 | Calvez et al. |
| 2007/0144178 A1 | 6/2007 | Burd et al. |
| 2007/0186558 A1 | 8/2007 | De Sousa et al. |
| 2007/0186559 A1 | 8/2007 | De Sousa et al. |
| 2016/0131045 A1 | 5/2016 | Bascones et al. |
| 2017/0284210 A1 | 10/2017 | Bartley et al. |

\* cited by examiner

COMBUSTOR SEAL FOR A GAS TURBINE ENGINE COMBUSTOR

BACKGROUND

The present disclosure relates to a gas turbine engine and, more particularly, to a combustor section therefor.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

Among the engine components, relatively high temperatures are observed in the combustor section such that cooling airflow is provided to meet desired service life requirements. The combustor section typically includes a combustion chamber formed by an inner and outer wall assembly. Each wall assembly includes a support shell lined with heat shields often referred to as liner panels. In certain combustion architectures, dilution passages direct airflow to condition air within the combustion chamber.

The aft end of the combustion chamber is necessarily in close proximity to a first row of HPT vanes. During normal engine operation hot gases collect in this area, which may result in accelerated combustor oxidation, and perhaps eventually acute durability issues to these areas of the combustor.

SUMMARY

A combustor seal for use in a combustor of a gas turbine engine according to one disclosed non-limiting embodiment of the present disclosure can include a seal with a multiple of slots that correspond with a multiple of 1st High Pressure Turbine (HPT) vanes.

A further embodiment of the present disclosure may include, wherein the seal ring is a full ring.

A further embodiment of the present disclosure may include, wherein each of the multiple of slots correspond to each respective multiple of 1st HPT vanes.

A further embodiment of the present disclosure may include, wherein a length of each of the multiple of slots correspond to leading edge thickness of the respective 1st HPT vane.

A further embodiment of the present disclosure may include, wherein a length of each of the multiple of slots is about 0.5 inches (12.5 mm).

A further embodiment of the present disclosure may include at least one cooling passage associated with each of the multiple of slots.

A further embodiment of the present disclosure may include, wherein the cooling passage is directed to convey a cooling jet through the slot.

A further embodiment of the present disclosure may include a group of cooling passages associated with each of the multiple of slots.

A further embodiment of the present disclosure may include, wherein each group of cooling passages includes four (4) passages, each directed to convey a cooling jet through the slot.

A combustor seal for use in a combustor of a gas turbine engine, comprising:

a seal with a multiple of slots that correspond with a multiple of 1st HPT vanes and a group of cooling passages associated with each of the multiple of slots.

A further embodiment of the present disclosure may include, wherein a length of each of the multiple of slots correspond to leading edge thickness of the respective 1st HPT vane.

A further embodiment of the present disclosure may include, wherein a length of each of the multiple of slots is about 0.5 inches (12.5 mm).

A further embodiment of the present disclosure may include, wherein each group of cooling passages includes four (4) passages, each directed to convey a cooling jet through the slot.

A method of cooling within a gas turbine engine according to one disclosed non-limiting embodiment of the present disclosure can include communicating cooling air through combustor seal toward each of a multiple of 1st High Pressure Turbine (HPT) vanes.

A further embodiment of the present disclosure may include communicating the cooling air through a cooling passages and a slot associated with the respective cooling passages.

A further embodiment of the present disclosure may include communicating the cooling air from the cooling passages through the slot, the slot of a length that corresponds to leading edge thickness of the respective 1st HPT vane.

A further embodiment of the present disclosure may include communicating the cooling air through a respective group of cooling passages and a slot associated with the respective group of cooling passages.

A further embodiment of the present disclosure may include communicating the cooling air from the group of cooling passages through the slot, the slot of a length that corresponds to leading edge thickness of the respective 1st HPT vane.

A further embodiment of the present disclosure may include locating the combustor seal between an interface between an outer diameter of the combustor chamber and a High Pressure Turbine (HPT) ring.

A further embodiment of the present disclosure may include, wherein the cooling air utilizes the full pressure drop of P4/P3 air.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
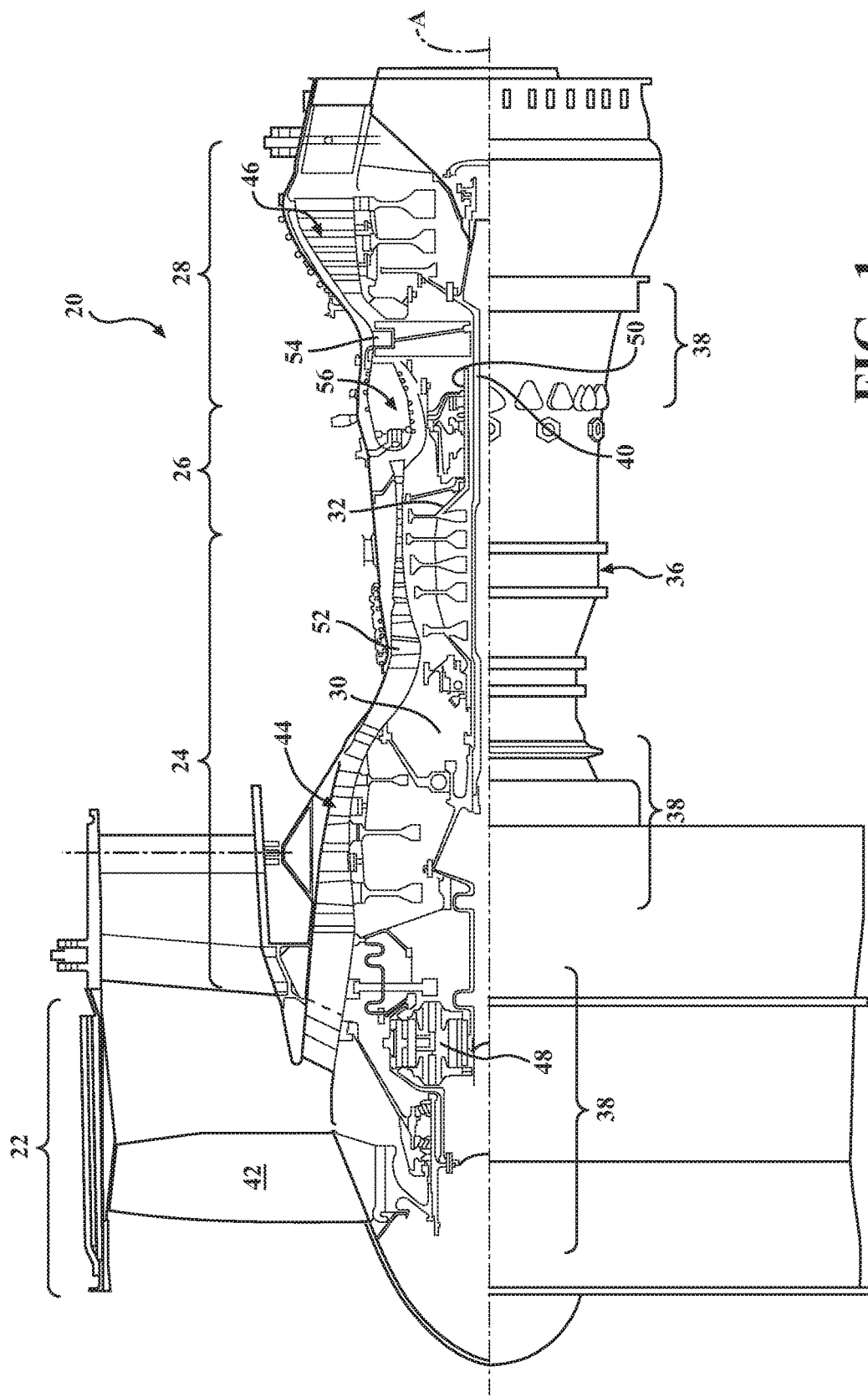
FIG. 1 is a schematic cross-section of an example gas turbine engine architecture.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Alternative engine architectures 200 might include an augmentor section among other systems or features. The fan section 22 drives air along a bypass flowpath and into the compressor section 24. The compressor section 24 drives air along a core flowpath for compression and communication into the combustor section 26, which then expands and directs the air through the turbine section 28. Although depicted as a turbofan in the disclosed non-limiting embodiment, it should be appreciated that the concepts described herein are not limited to use with turbofans as the teachings may be applied to other types of turbine engines such as a turbojets, turboshafts, and three-spool (plus fan) turbofans wherein an intermediate spool includes an intermediate pressure compressor ("IPC") between a Low Pressure Compressor ("LPC") and a High Pressure Compressor ("HPC"), and an intermediate pressure turbine ("IPT") between the high pressure turbine ("HPT") and the Low pressure Turbine ("LPT").

The engine 20 generally includes a low spool 30 and a high spool 32 mounted for rotation about an engine central longitudinal axis A relative to an engine static structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and high pressure turbine ("HPT") 54. A combustor 56 is arranged between the HPC 52 and the HPT 54. The inner shaft 40 and the outer shaft 50 are concentric and rotate about the engine central longitudinal axis A which is collinear with their longitudinal axes.

Core airflow is compressed by the LPC 44, then the HPC 52, mixed with the fuel and burned in the combustor 56, then expanded over the HPT 54 and the LPT 46. The LPT 46 and HPT 54 rotationally drive the respective low spool 30 and high spool 32 in response to the expansion. The main engine shafts 40, 50 are supported at a plurality of points by bearing systems 38 within the static structure 36.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3, and in another example is greater than about 2.5:1. The geared turbofan enables operation of the low spool 30 at higher speeds which can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting embodiment, the bypass ratio of the gas turbine engine 20 is greater than about ten (10:1), the fan diameter is significantly larger than that of the LPC 44, and the LPT 46 has a pressure ratio that is greater than about five (5:1). It should be appreciated, however, that the above parameters are only exemplary of one embodiment of a geared architecture engine and that the present disclosure is applicable to other gas turbine engines including direct drive turbofans.

In one embodiment, a significant amount of thrust is provided by the bypass flow path due to the high bypass ratio. The fan section 22 of the gas turbine engine 20 is designed for a particular flight condition—typically cruise at about 0.8 Mach and about 35,000 feet (10668 m). This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of $(\text{"Tram"}/518.7)^{0.5}$. The Low Corrected Fan Tip Speed according to one non-limiting embodiment of the example gas turbine engine 20 is less than about 1150 fps (351 m/s).

Figure 2:
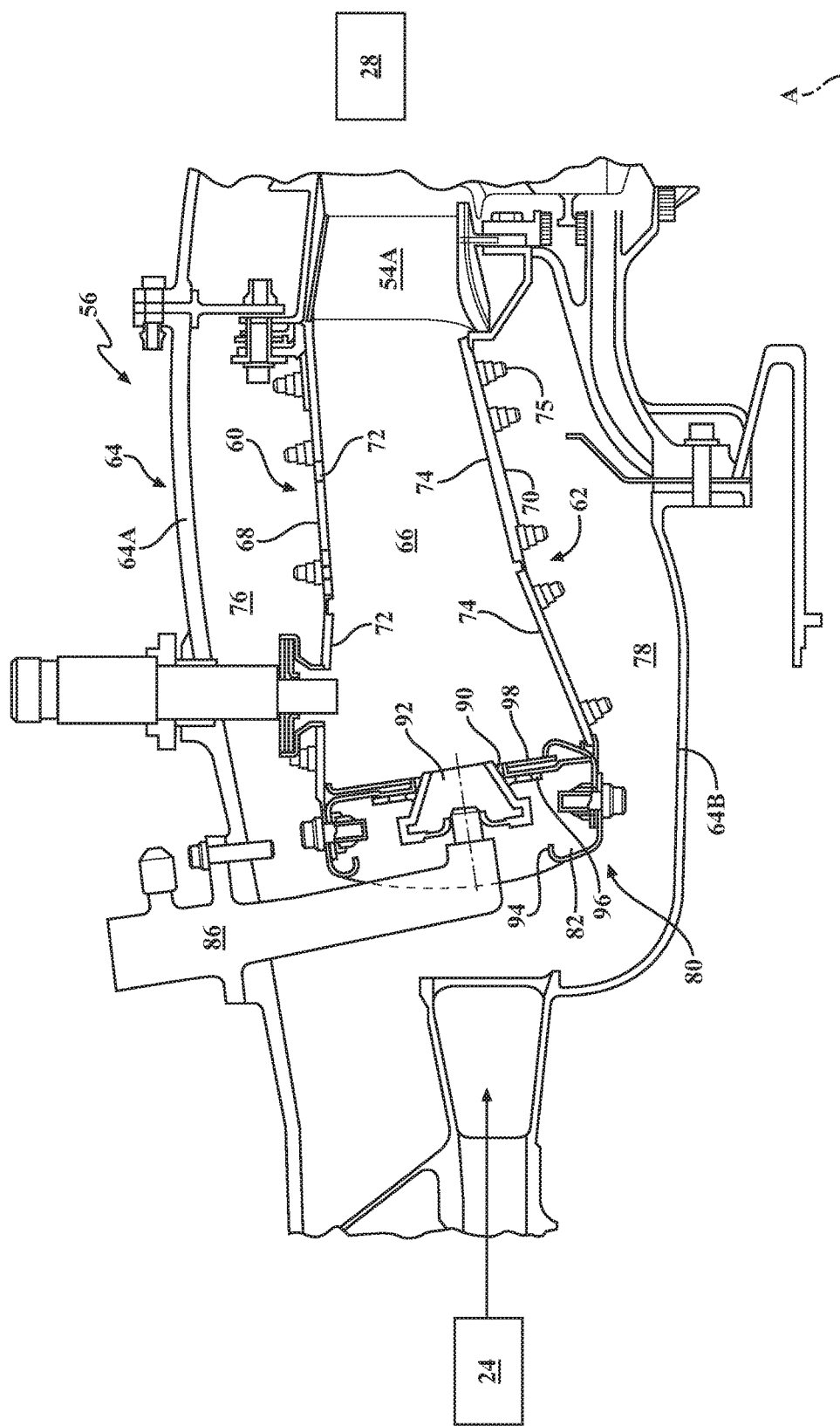
FIG. 2 is an expanded longitudinal schematic sectional view of a combustor section according to one non-limiting embodiment that may be used with the example gas turbine engine architectures.

With reference to FIG. 2, the combustor section 26 generally includes a combustor 56 with an outer combustor wall assembly 60, an inner combustor wall assembly 62, and a diffuser case module 64. The outer combustor wall assembly 60 and the inner combustor wall assembly 62 are spaced apart such that a combustion chamber 66 is defined therebetween. The combustion chamber 66 is generally annular in shape to surround the engine central longitudinal axis A.

The outer combustor liner assembly 60 is spaced radially inward from an outer diffuser case 64A of the diffuser case module 64 to define an outer annular plenum 76. The inner combustor liner assembly 62 is spaced radially outward from an inner diffuser case 64B of the diffuser case module 64 to define an inner annular plenum 78. It should be appreciated that although a particular combustor is illustrated, other combustor types with various combustor liner arrangements will also benefit herefrom. It should be further appreciated that the disclosed cooling flow paths are but an illustrated embodiment and should not be limited only thereto.

The combustor wall assemblies 60, 62 contain the combustion products for direction toward the turbine section 28. Each combustor wall assembly 60, 62 generally includes a respective support shell 68, 70 which supports one or more liner panels 72, 74 mounted thereto arranged to form a liner array. The support shells 68, 70 may be manufactured by, for example, the hydroforming of a sheet metal alloy to provide the generally cylindrical outer shell 68 and inner shell 70.

Each of the liner panels 72, 74 may be generally rectilinear with a circumferential arc. The liner panels 72, 74 may be manufactured of, for example, a nickel based super alloy, ceramic or other temperature resistant material. In one disclosed non-limiting embodiment, the liner array includes a multiple of forward liner panels 72A and a multiple of aft liner panels 72B that are circumferentially staggered to line the outer shell 68. A multiple of forward liner panels 74A and a multiple of aft liner panels 74B are circumferentially staggered to line the inner shell 70. The multiple of aft liner panels 72B, 74B, are in close proximity in this area and may also experiences oxidation.

The combustor 56 further includes a forward assembly 80 immediately downstream of the compressor section 24 to receive compressed airflow therefrom. The forward assembly 80 generally includes a cowl 82, a bulkhead assembly 84, and a multiple of swirlers 90 (one shown). Each of the swirlers 90 is circumferentially aligned with one of a multiple of fuel nozzles 86 (one shown) and the respective hood ports 94 to project through the bulkhead assembly 84.

The bulkhead assembly 84 includes a bulkhead support shell 96 secured to the combustor walls 60, 62, and a multiple of circumferentially distributed bulkhead liner panels 98 secured to the bulkhead support shell 96 around the swirler opening. The bulkhead support shell 96 is generally annular and the multiple of circumferentially distributed bulkhead liner panels 98 are segmented, typically one to each fuel nozzle 86 and swirler 90.

The cowl 82 extends radially between, and is secured to, the forwardmost ends of the combustor walls 60, 62. The cowl 82 includes a multiple of circumferentially distributed hood ports 94 that receive one of the respective multiple of fuel nozzles 86 and facilitates the direction of compressed air into the forward end of the combustion chamber 66 through a swirler opening 92. Each fuel nozzle 86 may be secured to the diffuser case module 64 and project through one of the hood ports 94 and through the swirler opening 92 within the respective swirler 90.

The forward assembly 80 introduces core combustion air into the forward section of the combustion chamber 66 while the remainder enters the outer annular plenum 76 and the inner annular plenum 78. The multiple of fuel nozzles 86 and adjacent structure generate a blended fuel-air mixture that supports stable combustion in the combustion chamber 66.

Opposite the forward assembly 80, the outer and inner support shells 68, 70 are mounted to a first row of Nozzle Guide Vanes (NGVs) 54A in the HPT 54. The NGVs 54A are static engine components which direct core airflow combustion gases onto the turbine blades of the first turbine rotor in the turbine section 28 to facilitate the conversion of pressure energy into kinetic energy. The core airflow combustion gases are also accelerated by the NGVs 54A because of their convergent shape and are typically given a "spin" or a "swirl" in the direction of turbine rotor rotation. The turbine rotor blades absorb this energy to drive the turbine rotor at high speed.

Figure 3:
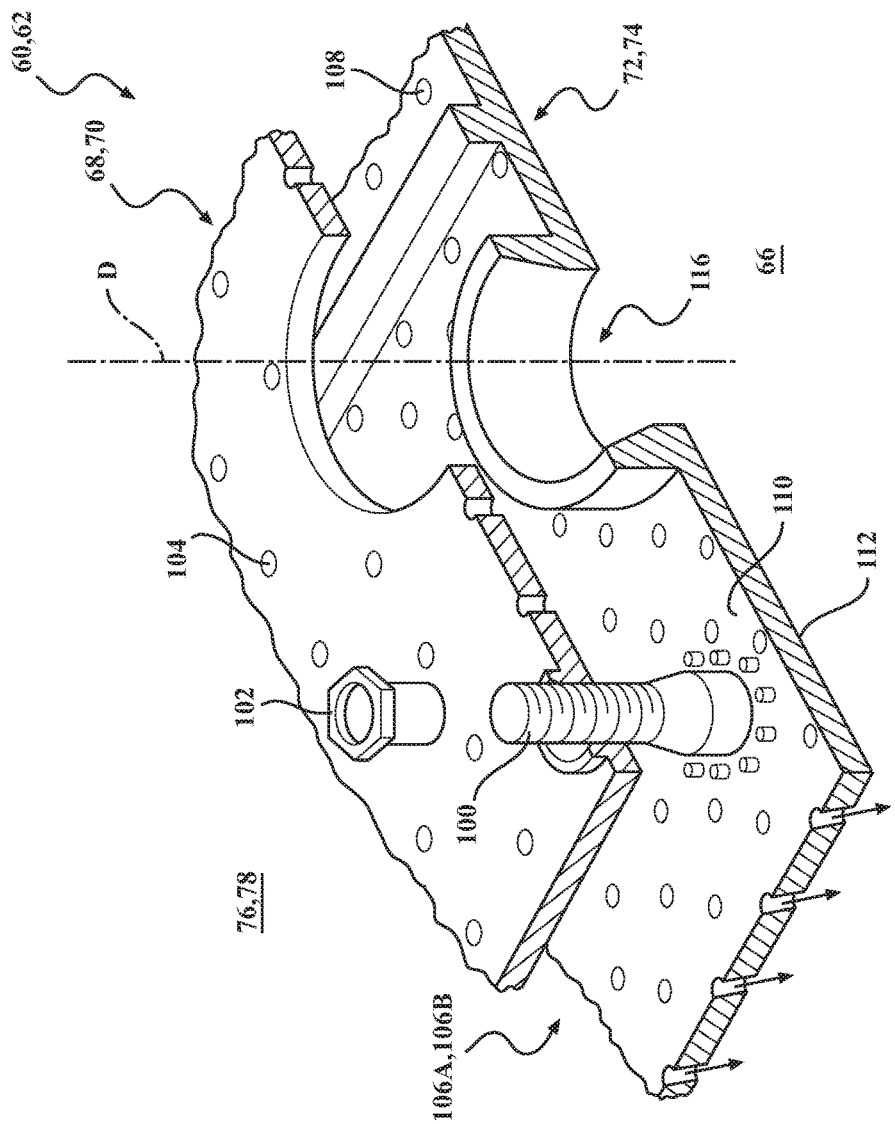
FIG. 3 is an exploded partial sectional view of a portion of a combustor wall assembly.
Figure 4:
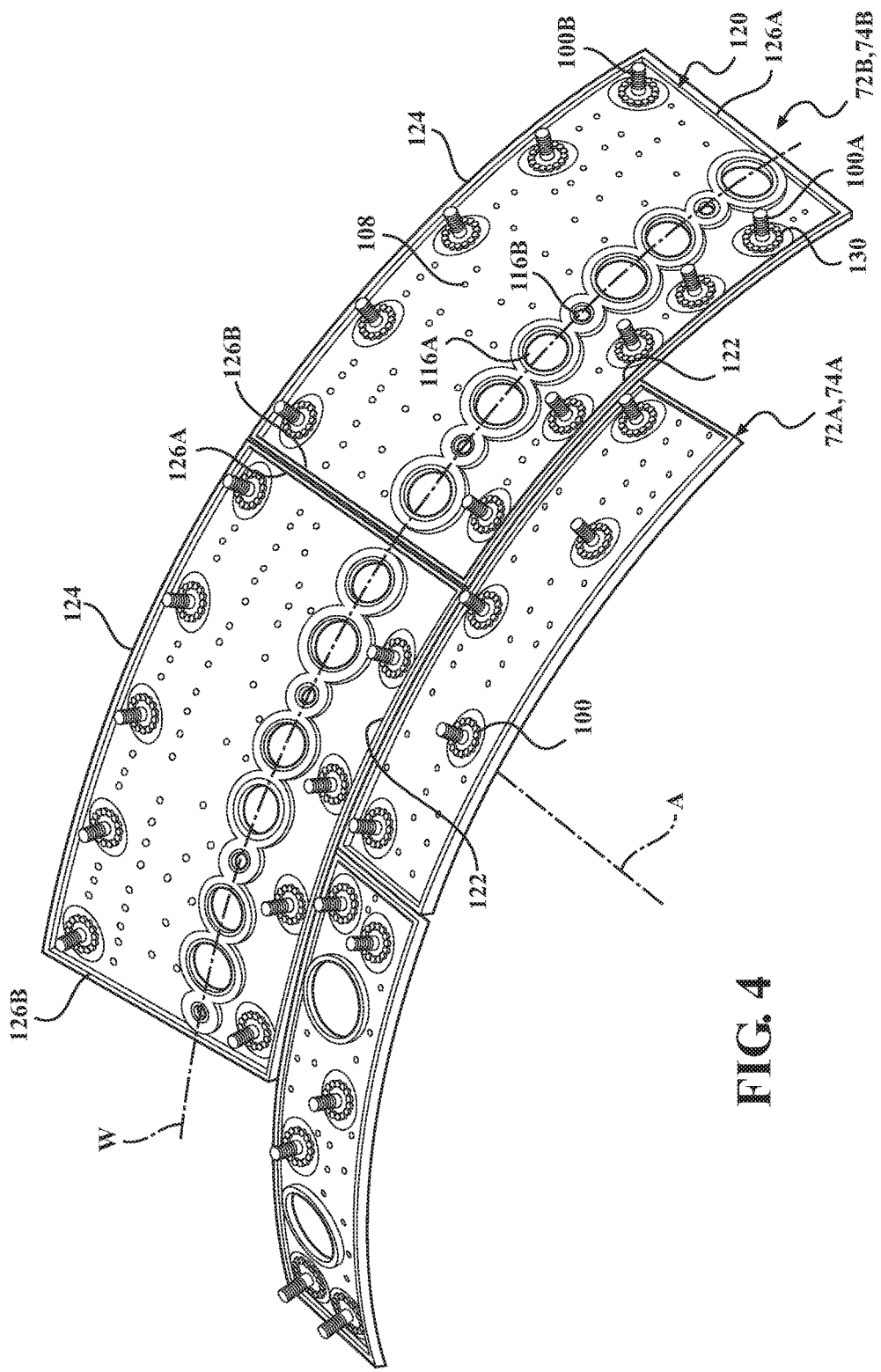
FIG. 4 is a perspective cold side view of a portion of a liner panel array.
Figure 5:
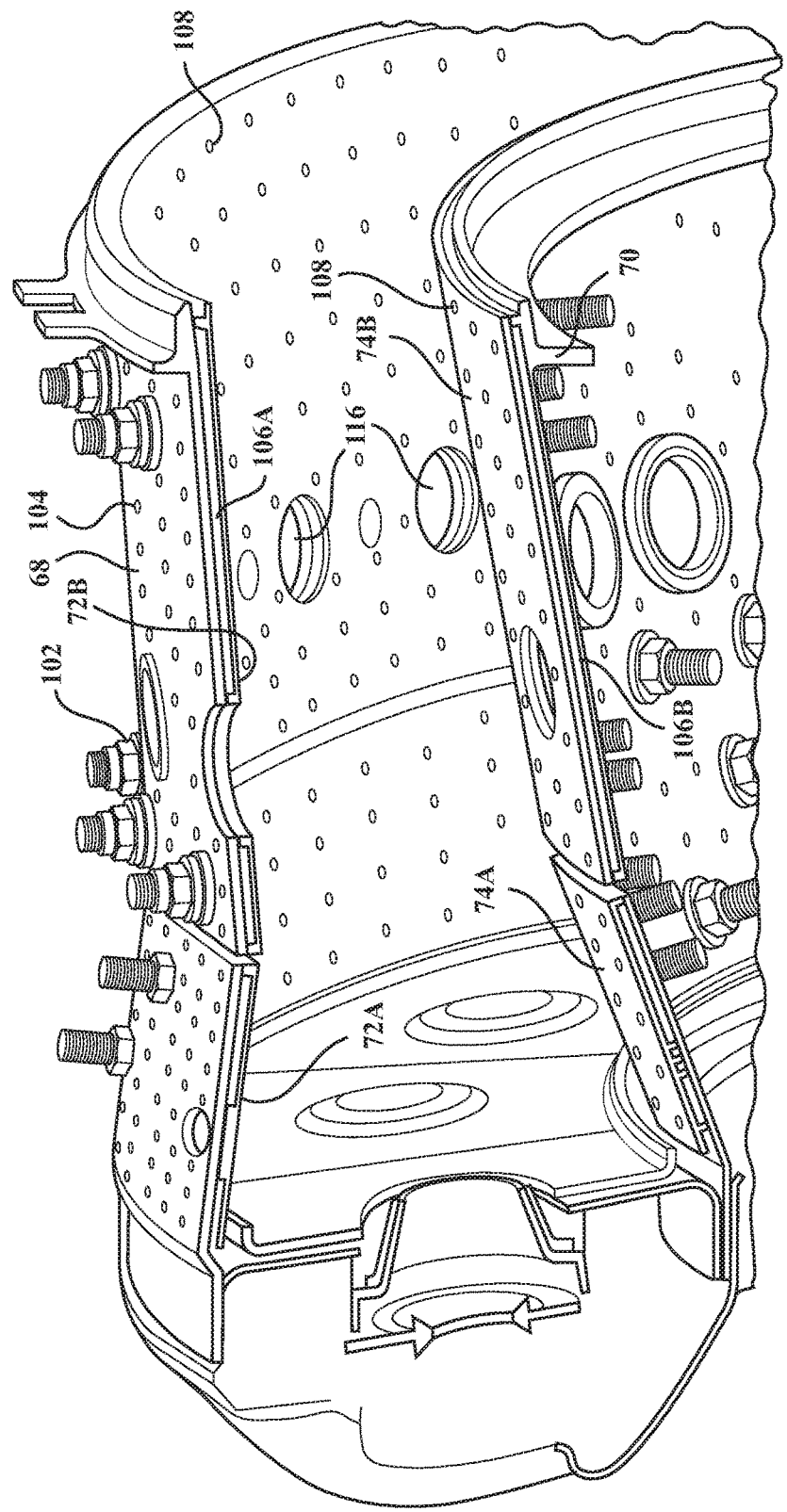
FIG. 5 is a perspective partial sectional view of a combustor.

With reference to FIG. 3, a multiple of studs 100 extend from each of the liner panels 72, 74 so as to permit a liner array (partially shown in FIG. 4) of the liner panels 72, 74 to be mounted to their respective support shells 68, 70 with fasteners 102 such as nuts. That is, the studs 100 project rigidly from the liner panels 72, 74 to extend through the respective support shells 68, 70 and receive the fasteners 102 on a threaded section thereof (FIG. 5).

A multiple of cooling impingement passages 104 penetrate through the support shells 68, 70 to allow air from the respective annular plenums 76, 78 to enter cavities 106 formed in the combustor walls 60, 62 between the respective support shells 68, 70 and liner panels 72, 74. The impingement passages 104 are generally normal to the surface of the liner panels 72, 74. The air in the cavities 106 provides cold side impingement cooling of the liner panels 72, 74 that is generally defined herein as heat removal via internal convection.

A multiple of effusion passages 108 penetrate through each of the liner panels 72, 74. The geometry of the passages, e.g., diameter, shape, density, surface angle, incidence angle, etc., as well as the location of the passages with respect to the high temperature combustion flow also contributes to effusion cooling. The effusion passages 108 allow the air to pass from the cavities 106 defined in part by a cold side 110 of the liner panels 72, 74 to a hot side 112 of the liner panels 72, 74 and thereby facilitate the formation of a thin, relatively cool, film of cooling air along the hot side 112.

Figure 6:
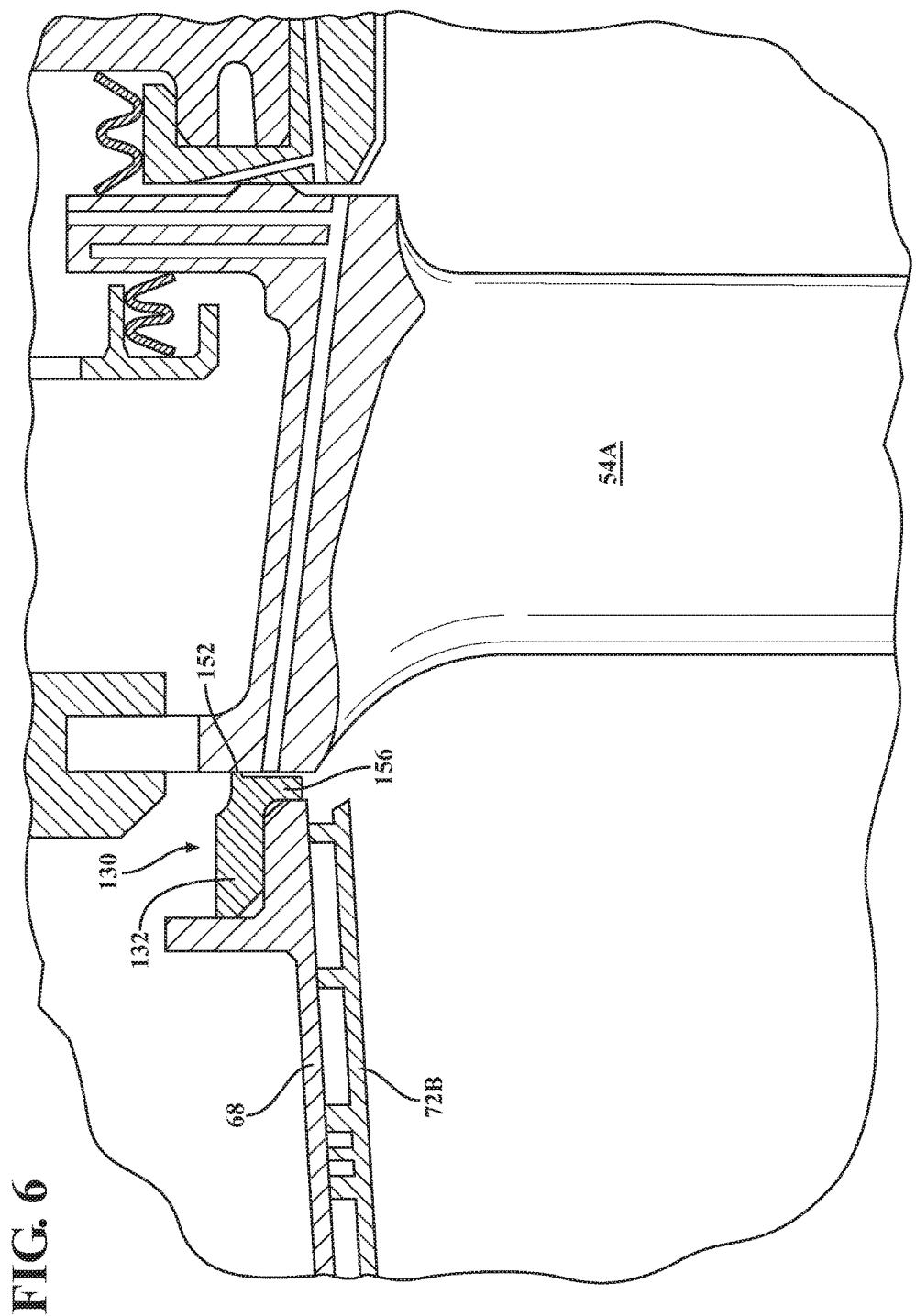
FIG. 6 is a sectional view of a portion of a combustor adjacent to a first row of Nozzle Guide Vanes (NGVs) in the HPT.

With reference to FIG. 6, an interface 130 between the outer support shell 68 to the first row of Nozzle Guide Vanes (NGVs) 54A in the HPT 54 includes a combustor seal 132 therebetween. The aft end, of the combustor opposite the forward assembly 80 is necessarily in close proximity to the leading edge of the first row of HPT vanes 54A, specifically the outer diameter of the leading edge of the HPT vane 54. During normal engine operation hot gases, have heretofore collected in this area. The proximity to the support shells 68, 70 the first row of Nozzle Guide Vanes (NGVs) 54A and the seal 132 may result in accelerated oxidation. Inspection of engine hardware has show that the buildup occurs at the point on the aft combustor face that is directly in-front of the 1st HPT vanes 54A.

Figure 7:
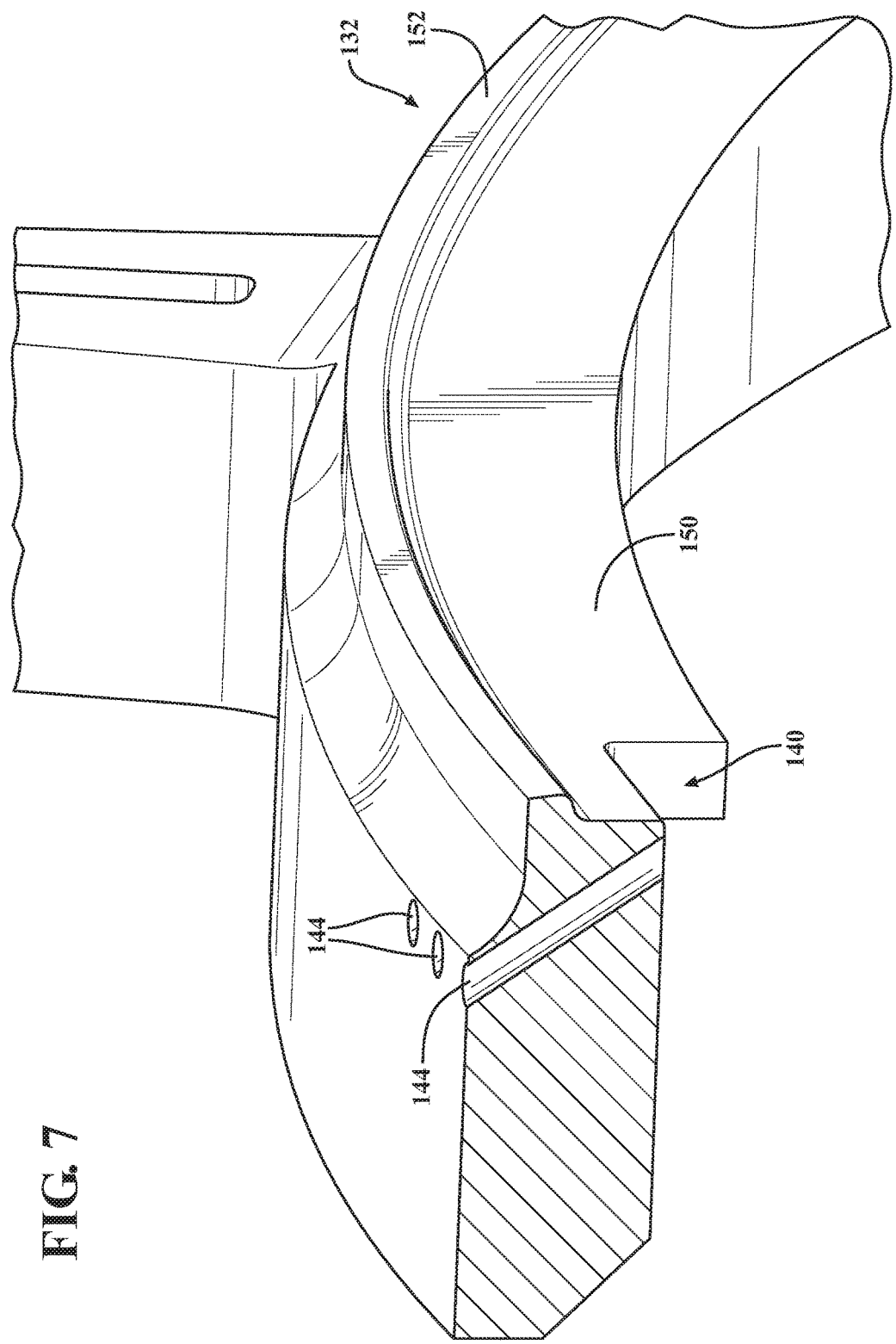
FIG. 7 is a partial perspective view of a combustor seal.
Figure 8:
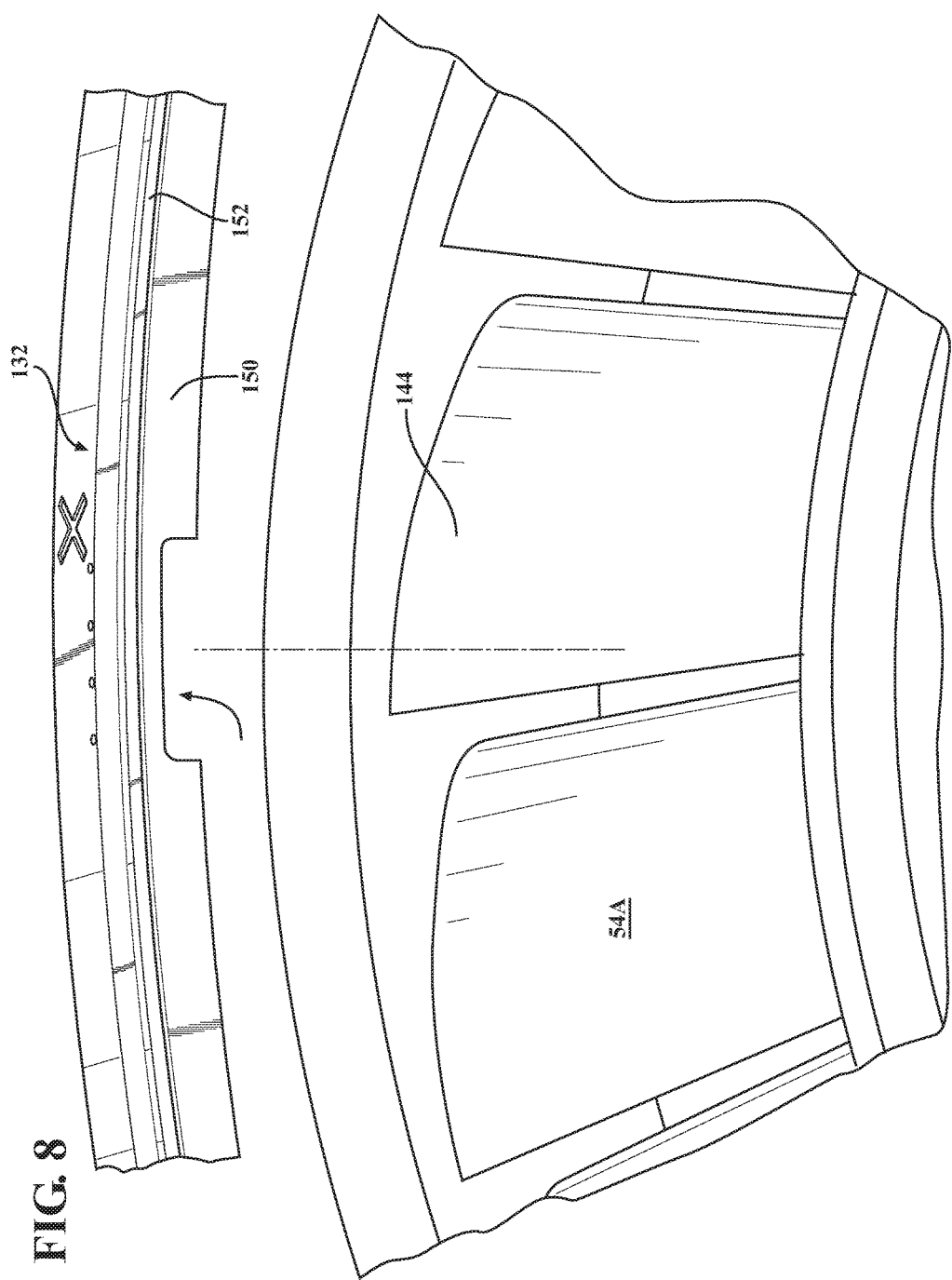
FIG. 8 is a front view of a combustor seal adjacent to the first row of Nozzle Guide Vanes (NGVs) in the HPT according to one disclosed non-limiting embodiment.
Figure 9:
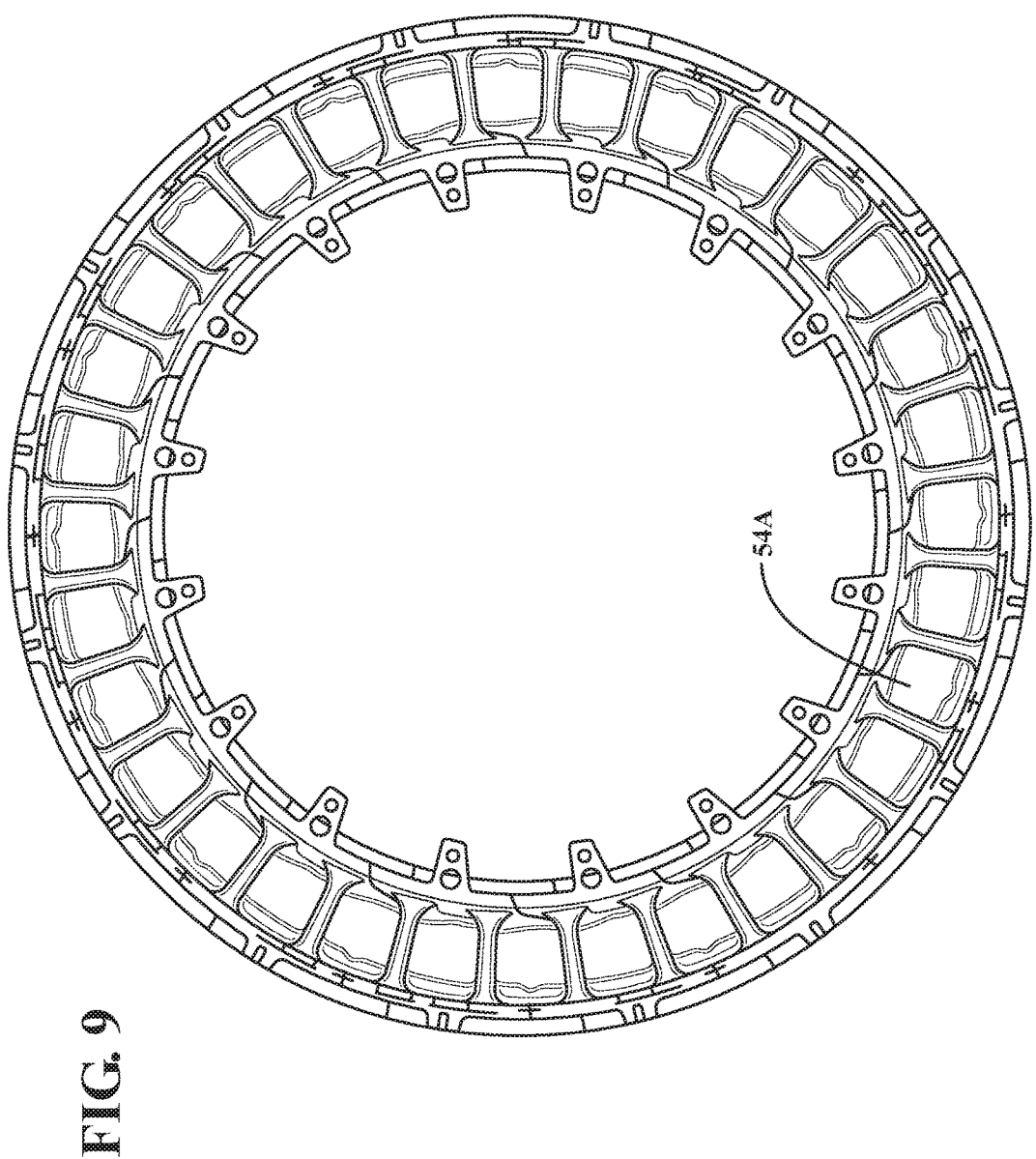
FIG. 9 is a front view of a first row of Nozzle Guide Vanes (NGVs) in the HPT.

With reference to FIG. 7, the combustor seal 132, which is typically a full ring, is specifically tailored to the configuration of the 1st HPT vane 54A array. The combustor seal 132 includes a multiple of slots 140, each of which correspond to respective 1st HPT vane 54A. That is, the slot 140 is directly in front of each 1st HPT vane 54A and extends for a length that coincides with a leading edge thickness 142 of the 1st HPT vane 54A airfoil 144 (FIG. 8). In one example, the slot 140 is about 0.5 inches (12.5 mm) in length and as there are sixteen (16) 1st HPT vanes 54A, there are sixteen (16) slots 140 (FIG. 9).

Figure 10:
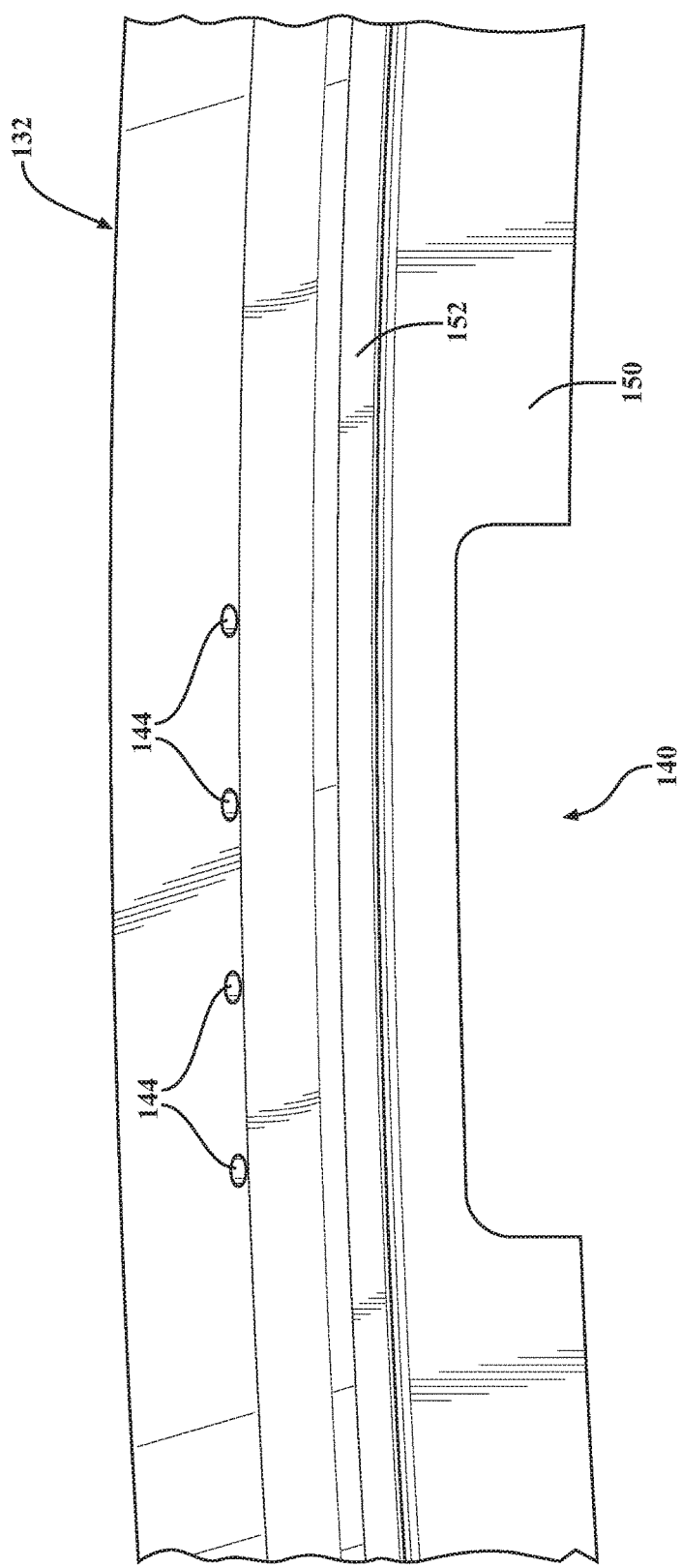
FIG. 10 is an expanded front view of a combustor seal with a slot and cooling holes adjacent to a single Nozzle Guide Vanes (NGVs).

The combustor seal 132 further includes a multiple of cooling passages 144 that are arranged in groups (FIG. 10), each group associated with a slot 140. In this example, each group includes four (4) cooling holes each of which have a diameter of 0.025 inches (0.635 mm). The cooling passages 144 purge the area between combustor and 1st HPT vane 54A with P3 air. As further perspective, the outer annular plenum 76 in one example operates at a pressure of approximately 500 psia (3447 kPa) and is referred to herein as P3. P1 is a pressure in front of the fan section 22; P2 is a pressure at the leading edge of the fan 42; P2.5 is between the LPC 44 and the HPC 52; P3 is the pressure aft of the LPC 44; P4 is the pressure in the combustion chamber 66; P4.5 is the pressure between the HPT 54 and the LPT 46; and P5 is the pressure aft of the LPT 46 (FIG. 1). The cooling passages 144 thereby utilize the full pressure drop of P4/P3.

The geometry of the combustor seal 132 requires the slot 130 to provide an unobstructed airflow exit from the cooling passages 144 to be unobstructed by the radially directed lip 150 of the combustor seal (also shown in FIG. 11). As a seal wear nub 152 is worn down over time, the 1st HPT vane 54A platform 154 will eventually come into contact with the lip 150 (FIG. 6). The slot 140 is positioned to allow for some of the lip 150 to remain and thereby maintain the seal interface.

The cooled combustor seal 132 ameliorates the apparent conflict between cooling air in a combustor environment. This design balances desirable cooling air while preventing excessive NOX emissions, reduces emissions, increases durability and time-on-wing for improved reliability.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A combustor seal between an outer support shell of a combustor and a row of nozzle guide vanes in a high pressure turbine of a gas turbine engine, comprising:
    a full ring seal with a multiple of slots and a seal wear nub that axially extends transverse to a lip of the full ring seal, each of the multiple of slots correspond to one of the nozzle guide vanes in the high pressure turbine such that the seal wear nub is worn down over time, a platform of the nozzle guide vanes come into contact with the lip; and
    a cooling passage through the full ring seal adjacent each of the multiple of slots, the cooling passage directed to convey a cooling jet through the respective slot.

2. The combustor seal as recited in claim 1, wherein each of the multiple of slots correspond to a respective multiple of Nozzle Guide Vanes (NGVs) in the row of nozzle guide vanes.

3. The combustor seal as recited in claim 1, wherein a length of each of the multiple of slots correspond to leading edge thickness of the respective Nozzle Guide Vanes (NGVs) in the row of nozzle guide vanes.

4. The combustor seal as recited in claim 1, wherein a length of each of the multiple of slots is about 0.5 inches (12.5 mm).

5. The combustor seal as recited in claim 1, further comprising a group of cooling passages associated with each of the multiple of slots.

6. The combustor seal as recited in claim 5, wherein each group of cooling passages includes four (4) passages, each directed to convey a cooling jet through the slot.

7. A combustor seal between an outer support shell of a combustor and a row of nozzle guide vanes in a high pressure turbine of a gas turbine engine, comprising:
    a full ring seal with a multiple of slots and a seal wear nub that axially extends from a lip of the full ring seal, each of the multiple of slots correspond to one of the nozzle guide vanes in the high pressure turbine such that as the wear nub is worn down over time, a platform of the nozzle guide vanes come into contact with the lip; and
    a multiple of groups of cooling passage through the full ring seal adjacent each of the multiple of slots, each of the multiple of groups of cooling passage directed to convey a cooling jet through the respective slot.

8. The combustor seal as recited in claim 7, wherein a length of each of the multiple of slots correspond to leading edge thickness of the respective Nozzle Guide Vanes (NGVs) in the row of nozzle guide vanes.

9. The combustor seal as recited in claim 7, wherein a length of each of the multiple of slots is about 0.5 inches (12.5 mm).

10. The combustor seal as recited in claim 5, wherein each group of cooling passages includes four (4) passages, each directed to convey a cooling jet through the slot.

11. A method of cooling a combustor seal within a gas turbine engine, comprising:
    communicating cooling air through a full ring combustor seal toward each of a multiple of 1st High Pressure Turbine (HPT) vanes to purge the area between an outer support shell of a combustor and each of the multiple of 1st High Pressure Turbine (HPT) vanes; and
    permitting a wear nub to be worn down over time such that a platform of a nozzle guide vane comes into contact with a lip of the full ring combustor seal.

12. The method as recited in claim 11, further comprising, communicating the cooling air through a cooling passages and a slot associated with the respective cooling passages.

13. The method as recited in claim 12, further comprising, communicating the cooling air from the cooling passages through the slot, the slot of a length that corresponds to leading edge thickness of the respective Nozzle Guide Vanes (NGVs) in the row of nozzle guide vanes.

14. The method as recited in claim 11, further comprising, communicating the cooling air through a respective group of cooling passages and a slot associated with the respective group of cooling passages.

15. The method as recited in claim 14, further comprising, communicating the cooling air from the group of cooling passages through the slot, the slot of a length that corresponds to leading edge thickness of the respective Nozzle Guide Vanes (NGVs) in the row of nozzle guide vanes.

16. The method as recited in claim 11, further comprising, locating the combustor seal between an interface between an outer diameter of the combustor chamber and a High Pressure Turbine (HPT) ring.

17. The method as recited in claim 11, wherein the cooling air utilizes the full pressure drop of P4/P3 air.

18. The combustor seal as recited in claim 2, wherein as the seal wear nub is worn down over time, the Nozzle Guide Vanes (NGVs) platform in the row of nozzle guide vanes contacts the lip such that the lip maintains the seal interface.

19. The method as recited in claim 13, further comprising, wherein a multiple of slots and the seal wear nub axially extends from a lip of the full ring combustor seal, each of the multiple of slots correspond to one of the nozzle guide vanes in the high pressure turbine.

* * * * *